United States Patent [19]

Muraco et al.

[11] 4,083,932

[45] Apr. 11, 1978

[54] METHOD AND APPARATUS FOR TREATING GASES

[75] Inventors: John M. Muraco; Lonnie V. Hege; David G. Miller, all of Lexington, N.C.

[73] Assignee: PPG Industries, Inc., Pittsburgh, Pa.

[21] Appl. No.: 760,304

[22] Filed: Jan. 18, 1977

Related U.S. Application Data

[62] Division of Ser. No. 685,584, May 12, 1976.

[51] Int. Cl.$^2$ ............................................. B01D 53/34
[52] U.S. Cl. ................................... 423/210; 423/240; 423/242; 55/71; 55/73; 261/116; 239/290
[58] Field of Search ............... 423/210, 240, 234, 242, 423/241; 239/290, 291; 55/68, 71, 73; 261/115–118, DIG. 75

[56] References Cited

U.S. PATENT DOCUMENTS

| | | | |
|---|---|---|---|
| 1,234,378 | 7/1917 | Parkin | 239/290 |
| 1,752,031 | 3/1930 | Schaer | 123/32 |
| 2,373,595 | 4/1945 | Peeps | 299/140 |
| 2,457,304 | 12/1948 | Crowe | 158/11 |
| 2,478,557 | 8/1949 | Pell et al. | 299/140 |
| 2,655,986 | 10/1953 | Pennington | 158/11 |
| 2,708,597 | 5/1956 | Wiitala et al. | 299/59 |
| 2,712,961 | 7/1955 | Richardson | 299/59 |
| 2,747,931 | 5/1956 | Wilson | 299/28.5 |
| 2,774,639 | 12/1956 | Noon et al. | 299/118 |
| 2,970,772 | 2/1961 | Boosinger et al. | 239/105 |
| 3,013,731 | 12/1961 | Carlisle | 239/132 |
| 3,332,623 | 7/1967 | Gallant | 239/105 |
| 3,814,327 | 6/1974 | Dada | 239/290 |
| 3,880,639 | 4/1975 | Bodner et al. | 65/134 |
| 3,995,005 | 11/1976 | Teller | 423/210 |

Primary Examiner—Earl C. Thomas
Attorney, Agent, or Firm—Alan T. McDonald; John E. Curley

[57] ABSTRACT

A novel spraying method and apparatus are disclosed for treating a gaseous stream in a gas-liquid contact zone. The apparatus includes a housing surrounding a spray nozzle which is provided with an opening for releasing the spray to a gaseous stream to be treated. The housing is pressurized with gaseous fluid, preferably air. The gaseous fluid leaves the housing through an opening surrounding the spray head or nozzle and forms a cylindrical gas curtain or shroud of gas around the housing opening in which the spray head is mounted. The gas shroud protects the spray nozzle by prohibiting the gas from the gaseous stream being treated from entering the housing and substantially reducing direct contact with the spray nozzle.

6 Claims, 2 Drawing Figures

METHOD AND APPARATUS FOR TREATING GASES

This is a division of application Ser. No. 685,584, filed May 12, 1976.

BACKGROUND OF THE INVENTION

In the manufacture of glass and glass fibers, glass batch is melted in large furnaces which release gases which in the past have been released to the atmosphere. With the growing concern over the environment and pollution, these gases are now treated with wet scrubbers, a dry scrubber and other like equipment to remove harmful constituents in the gases before their release to the atmosphere. In one such treatment, acidic gases from a furnace stack are treated with a spray of alkaline material to neutralize the acidic materials contained in the gases and to condense some of the constituents of the stream in the treatment zone. One problem encountered with such a system is the problem of corrosion of the spray nozzles used to release the spray of alkaline material used to treat the gases. The problem is caused by the continuing contact of the highly acidic constituents of the gases present in the stream being treated with the metal surfaces of the spray nozzles. The corrosion attendant such a constant contact of acids with metal requires frequent replacement of the spray nozzles employed and the consequent shut down of the gas-liquid contact system for such replacement.

In U.S. Pat. No. 2,712,961 a spraying apparatus for treating a gaseous stream is disclosed. In this patent, the spray nozzle is protected from the environment surrounding it by forcing a stream of hot steam over the spray nozzle from an opening positioned well above the nozzle.

It is desirable to protect the spray nozzle from the harmful gases present in the system, thus reducing corrosion and its associated problems, without the necessity of employing a heated stream to protect the nozzle. It is also desirable to minimize exposure of pipes carrying the spray liquids or the protecting material to the gases present in the system.

THE PRESENT INVENTION

By means of the present invention, protection of the spray nozzles used in a gas-liquid contact treatment process is provided without the necessity of steam being used. The spray nozzle utilized in accordance with this invention is enclosed in a housing having an opening therein for releasing the spray from the nozzle cap to the gaseous stream to be treated. The housing is pressurized with a gas which is inert with respect to the gases present and the treating liquid, with the gas being released through an opening surrounding the spray issuing from the nozzle. The gaseous fluid used to pressurize the housing forms a generally cylindrical curtain or shroud around the opening of the housing in which the spray head or nozzle nests. This gas curtain prevents any of the gaseous stream being treated in the gas-liquid contact zone from entering the housing and substantially reduces gas impingement on the spray nozzle cap surfaces thereby reducing considerably the corrosion of the spray nozzle and the nozzle cap that would be normally encountered without the gas shroud. The invention has particular utility in the treatment of gases from glass furnaces where an acidic gaseous stream is treated with an alkaline spray traveling in a concurrent direction with these gases to neutralize the gases; however, the invention will be equally useful in treating gases in countercurrent flow with the alkaline spray.

DETAILED DESCRIPTION OF THE INVENTION

According to one aspect of the present invention apparatus is provided for treating gases containing acidic components which include a chamber through which the gases flow and a spraying assembly. This assembly includes a spray nozzle which has a spray cap through which treating fluid for the gases flows. The nozzle is located within a housing. The housing has an opening through which the nozzle end or cap protrudes. The housing is pressurized with a gas inert to the gases in the chamber and to the treating fluid. This gas exits the housing through the same opening through which the nozzle protrudes as a curtain or shroud surrounding the nozzle. This shroud prohibits the gases in the chamber from entering the housing and protects the nozzle cap from corrosion due to these gases.

In another aspect of the present invention a method of treating a gaseous stream is provided involving flowing the gaseous stream through a gas-liquid contact zone and introducing a spray of treating liquid into the zone. The spray of fluid is shrouded by the pressurized inert gas, with the inert gas thus protecting the spray nozzle through which the treating liquid flows. The protection is aided by limiting the intrusion of the spray nozzle into the gas-liquid contact zone by enveloping it in a housing and allowing only a small but significant length of the nozzle to protrude into the zone.

The treating liquids which may be employed are solutions or slurries of the alkali metal hydroxides, and preferably LiOH, KOH, or NaOH, the alkaline earth metal hydroxides, and particularly $Mg(OH)_2$ and/or $Ca(OH)_2$, or amines, such as ethanol amine, in the form of a spray mist. Preferably, in the case of glass furnace gas treatment, the liquid used is a $Ca(OH)_2$ slurry.

The gas employed to pressurize the housing is one which is inert to the treating liquids and to the gases in the chamber. This means that, at the temperatures of the system, no chemical reactions will occur between the pressurizing gas and either the treating liquid or the gases in the chamber. Typical of such gases are helium, hydrogen, nitrogen, air, and oxygen. Preferably, pressurized air is employed.

BRIEF DESCRIPTION OF THE DRAWINGS

The present invention will be more fully described with reference to the drawings, in which.

DETAILED DESCRIPTION OF THE DRAWINGS

Figure 1:
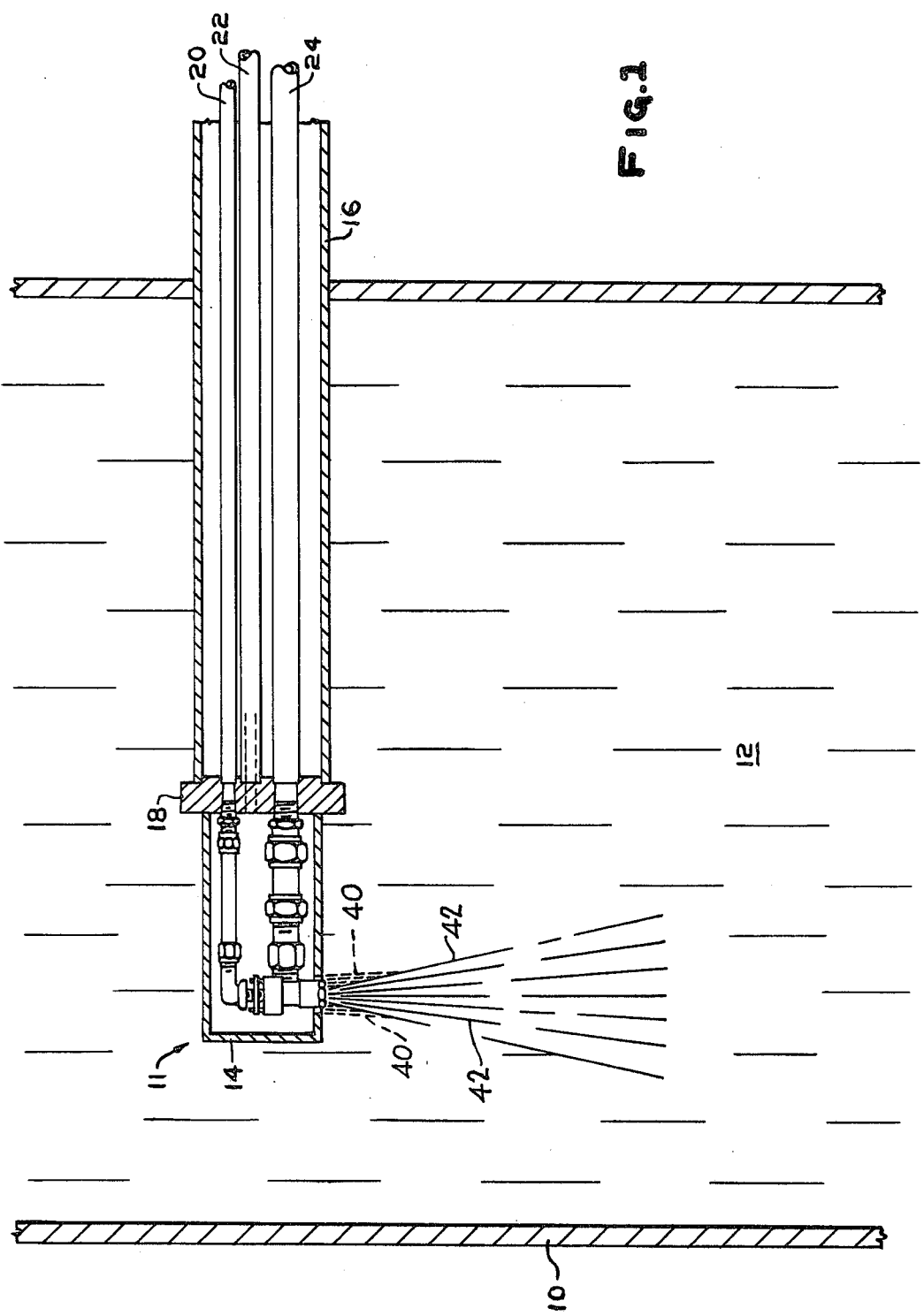
FIG. 1 is a diagrammatic illustration of the nozzle and spraying system of the instant invention used in a gas-liquid contact zone.
Figure 2:
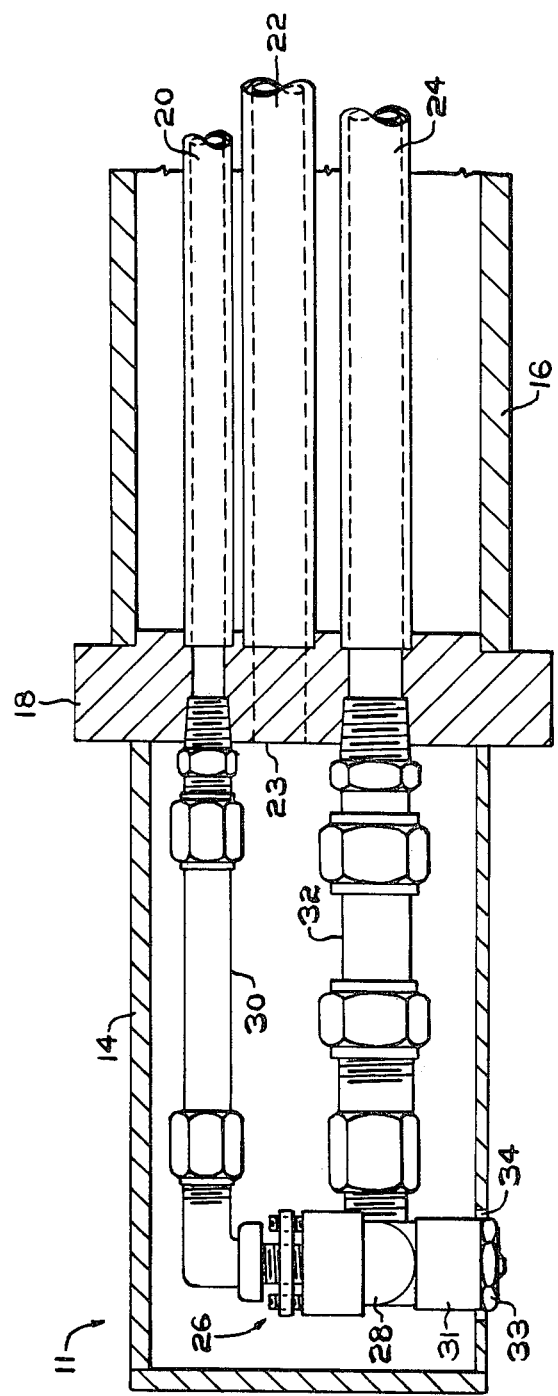
FIG. 2 illustrates the nozzle protection system of the instant invention.

Referring to the Figures, a chamber or duct 10 is shown which is connected to the source of the gases to be treated, not shown, has an area 12 therein containing gases. The gases as shown pass in a downward direction. Located within the duct 10 is a spraying apparatus generally designated as 11. The apparatus 11 includes a tube 16 having therein pipes 20, 22 and 24. A face plate 18 separates this tube 16 from a housing 14. The housing 14 contains pipes 30 and 32 and spray nozzle apparatus, generally illustrated as 26.

Pipe 20 contains a treating liquid which is to be released to the gaseous stream. Typical of the gas contact treating materials which may be employed are solutions or slurries of the alkali metal hydroxides, and preferably LiOH, NaOH, KOH, or the alkaline earth metal hydroxides, and particularly, $Mg(OH)_2$, and/or $Ca(OH)_2$ or amines, such as ethanol amine, in the form of a spray of liquid. The liquid is typically at a low temperature, i.e., substantially below the dew point of the hot gases in the stream being treated. In the case of glass furnace gas treatment, the gas contact liquid is preferably a $Ca(OH)_2$ slurry. Pipe 24 contains air which will be combined in the nozzle apparatus 26 with the basic fluid in pipe 20 to form a spray mist of the treating fluid. The liquid flows through pipe 20 in tube 16 through pipe 30 within housing 14 and to the nozzle body 28. At the same time air flows from pipe 24 in tube 16, through pipe 32 in the housing 14, and into the nozzle body 28 where the slurry and air are combined in the nozzle body 28 to form the spray mist 42.

The nozzle body 28 is preferably formed of a material which corrodes slowly such as Type 316L stainless steel. At the end of the nozzle body 28 in an extension 31. This is threaded at one end to a nozzle cap 33 and at its other end to the nozzle body 28. This extension 31 is formed of a desired length to vary the small but significant distance which the nozzle cap 33 extends out of the housing 14.

The pipe 22 within the tube 16 has an opening 23 at the end of the face plate 18 to the housing 14. This pipe 22 carried the inert gas for pressurizing the housing 14. The gas flows continuously throughout the housing 14 and exits, with the spray mist 42, through an opening 34 at the bottom of the housing 14 to flow into the gas-liquid contact zone. In the preferred embodiment, the inert gas from pipe 22 flows into the housing 14 at a pressure of between 10 and 70 psig (168,027 to 1,176,189 pascals) and preferably between 40 and 50 psig (672,180 and 840,135 pascals). The inert gas forms a generally cylindrical curtain or shroud 40 around the nozzle cap 33 extending from the opening 34 in the housing 14. Preferably, the nozzle cap 33 is extended from the opening 34 at a small but significant distance of about 0.1875 to 0.3125 inch (0.47625 to 0.79375 centimeter). Due to the small but significant extension of the nozzle cap 33 from the opening 34 and the air shroud 40 formed by the pressurized gas, the nozzle 26 is effectively shielded from the gaseous stream. Thus, no gases are able to pass into the opening 34 and contact with the nozzle cap 33 is substantially reduced. This effectively reduces corrosion of the cap 33 due to contact of its surfaces with the gases being treated. In addition, the pressurized air in the housing 14 acts to remove any slurry or solution which may accumulate on the nozzle cap 33 as it passes through the opening 34, thus the nozzle cap 33 will not become clogged with slurry, with the resulting stoppage in spraying.

The gases leaving the system are thus significantly reduced in their acidic content. The present system has particular utility in the treating of acidic gases from a glass melt furnace. In such a system, the gases in the duct 10 are normally acidic and highly corrosive to the nozzle cap 33 since they contain such constituents as hydrogen fluoride, boric oxides and sulfur oxides such as sulfur dioxide and/or sulfur trioxide. The treating liquid carried in pipe 20 is preferably a slurry of alkaline material, such as calcium hydroxide, or the like. These alkaline materials neutralize the acidic constituents of the gas. The air pressurized housing 14 within which the nozzle apparatus 26 is carried combined with the effects of the air pressure within the housing effectively protects the nozzle cap 33 from the corrosive effects acidic multivalent present in the gaseous stream being treated.

EXAMPLE

In an apparatus as illustrated in the Figure, a DELAVAN ® 707 spray nozzle cap 33 having a spray angle of 50° was connected to a DELAVAN ® 31693 nozzle body 28 by means of 0.5 inch (1.27 centimeters) extension 31, thus providing a 0.1875 inch (0.47625 centimeter) extension of the nozzle cap 33 from the housing 14. Lime slurry concentration 2.5 percent $Ca(OH)_2$ entered the nozzle body 28 from pipe 30 at 40 psig (372,109 pascals) to provide 1.2 gallons per minute (4.54 liters per minute) of slurry. Air at a pressure of 60 psig (506,122 pascals) entered the nozzle body 28 from pipe 32. The housing 14 was pressurized by air entering through opening 23 in face plate 18 from pipe 22 at 45 psig (756,122 pascals) at a velocity of approximately 50 feet per second (15.24 meters per second). The nozzle cap 33 had an outer diameter of 0.875 inch (2.22 centimeters) and the opening 34 had a diameter of 1.0 inch (2.54 centimeters).

Gases from the furnace stack of a glass melting furnace were passed into the gas-liquid contact zone in which the lime slurry was being sprayed. The gas flow was approximately 3270 standard cubic feet per minute (80.6 cubic meters per minute) and the gas constituents were as follows:

TABLE 1

| Component | Pounds per Hour |
| --- | --- |
| $SO_2$ | 4.7 |
| $F_2$ | 1.5 |
| $B_2O_3$ | 1.0 |

Gases passed from the gas-liquid contact zone had a composition as follows:

TABLE 2

| Component | Pounds per Hour |
| --- | --- |
| $SO_2$ | 2.17 |
| $F_2$ | 0.03 |
| $B_2O_3$ | 0.23 |

Thus the present invention provides an efficient method and apparatus for treating a gaseous stream.

While the invention has been described with respect to a specific embodiment thereof, it is not intended to be so limited thereby, except as set forth in the accompanying claims.

We claim:

1. A method for treating a gaseous stream containing acidic components comprising introducing said gaseous stream into a gas-liquid contact zone, flowing said stream through said zone, passing a gaseous fluid and a liquid fluid into a spray nozzle having a nozzle cap connected thereto, mixing said gaseous fluid and said fluid in said nozzle to produce a spray mist, locating said nozzle within a housing, said housing including an opening therein, extending said nozzle cap through said opening in said housing and into said zone, pressurizing said housing with a gas, flowing said spray mist through said nozzle cap into said zone, passing said gas from said housing through said opening in a generally cylindrical path around said nozzle cap and into said zone, at a rate of flow and a pressure sufficient to prevent the flow of said acidic gas stream into said housing and over the surfaces of said nozzle cap, thereby preventing said gaseous stream from entering said housing and shrouding said nozzle cap from said gaseous stream, and removing from the zone a gas stream substantially reduced in acidic components.

2. The method of claim 1 wherein said liquid fluid is selected from the group consisting of alkaline metal hydroxides and alkaline earth metal hydroxides.

3. The method of claim 1 wherein said gaseous stream eminates from a glass melt furnace.

4. The method of claim 3 wherein said liquid fluid is $Ca(OH)_2$.

5. The method of claim 3 wherein said gaseous stream and spray mist flow cocurrently.

6. The method of claim 1 wherein said nozzle cap is extended between 0.1875 and 0.3125 inch (0.47625 and 0.79375 centimeter) through said opening in said housing.

* * * * *